United States Patent
Alasia et al.

(10) Patent No.: US 7,558,401 B2
(45) Date of Patent: *Jul. 7, 2009

(54) SYSTEM AND METHOD FOR NETWORK-BASED OBJECT AUTHENTICATION

(75) Inventors: Alfred V. Alasia, Lake Worth, FL (US); Alfred J. Alasia, Royal Palm Beach, FL (US); Thomas C. Alasia, Lake Worth, FL (US); Slobodan Cvetkovic, Lake Worth, FL (US); Igor Ilic, Boca Raton, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/926,222

(22) Filed: Oct. 29, 2007

(65) Prior Publication Data

US 2008/0044056 A1 Feb. 21, 2008

Related U.S. Application Data

(63) Continuation of application No. 11/207,437, filed on Aug. 19, 2005, which is a continuation-in-part of application No. 11/068,350, filed on Feb. 28, 2005, now Pat. No. 7,512,249.

(60) Provisional application No. 60/565,300, filed on Apr. 26, 2004.

(51) Int. Cl.
*G06K 9/00* (2006.01)
*G06K 9/36* (2006.01)
*G06K 9/46* (2006.01)

(52) U.S. Cl. ...................... 382/100; 382/233

(58) Field of Classification Search ................. 382/100, 382/135, 190, 218–220, 232, 233; 235/454, 235/462, 465, 469, 494; 713/150, 168, 170, 713/176, 179; 380/5, 51, 54, 206, 239; 283/17, 283/86, 93, 901; 348/461, 467, E7.061; 358/3.28
See application file for complete search history.

(56) References Cited

U.S. PATENT DOCUMENTS

| | | | | |
|---|---|---|---|---|
| 3,875,375 A | * | 4/1975 | Scuitto et al. | 235/380 |
| 4,689,477 A | * | 8/1987 | Goldman | 235/380 |
| 5,303,370 A | * | 4/1994 | Brosh et al. | 380/51 |
| 5,426,700 A | * | 6/1995 | Berson | 713/186 |
| 5,771,292 A | * | 6/1998 | Zunquan | 713/176 |
| 6,209,923 B1 | * | 4/2001 | Thaxton et al. | 283/72 |
| 6,532,541 B1 | * | 3/2003 | Chang et al. | 713/176 |

(Continued)

*Primary Examiner*—Amir Alavi
(74) *Attorney, Agent, or Firm*—Hunton & Williams LLP

(57) ABSTRACT

A method is provided for determining whether an object is an authentic object to which an expected encoded image has been applied. The expected encoded image having been constructed by encoding an authentication image using a set of one or more encoding parameters. The method comprises receiving a digital image of at least a portion of the test object including a target area where the expected encoded image would be applied if the test object is an authentic object. The method further comprises determining the one or more encoding parameters and applying a digital decoding algorithm to the captured digital image to establish a decoding result. The decoding result may then be compared to object authentication criteria to establish an authentication result. In particular embodiments of the invention, the actions of receiving, determining, applying and comparing are carried out by an authentication server and the digital image is received from an inspection processor over a network.

23 Claims, 8 Drawing Sheets

U.S. PATENT DOCUMENTS

| | | | | |
|---|---|---|---|---|
| 6,754,822 B1* | 6/2004 | Zhao | | 713/176 |
| 6,985,607 B2* | 1/2006 | Alasia et al. | | 382/112 |
| 7,315,629 B2* | 1/2008 | Alasia et al. | | 382/112 |
| 7,412,073 B2* | 8/2008 | Alasia et al. | | 382/100 |
| 7,421,581 B2* | 9/2008 | Alasia et al. | | 713/168 |
| 7,466,706 B2* | 12/2008 | Brown et al. | | 370/392 |
| 2004/0064699 A1* | 4/2004 | Hooker et al. | | 713/170 |
| 2005/0177726 A1* | 8/2005 | Alasia et al. | | 713/176 |
| 2005/0237577 A1* | 10/2005 | Alasia et al. | | 358/3.28 |
| 2005/0276442 A1* | 12/2005 | Alasia et al. | | 382/100 |
| 2006/0029278 A1* | 2/2006 | Alasia et al. | | 382/232 |
| 2007/0057061 A1* | 3/2007 | Alasia et al. | | 235/454 |
| 2008/0044056 A1* | 2/2008 | Alasia et al. | | 382/100 |
| 2008/0044089 A1* | 2/2008 | Alasia et al. | | 382/232 |
| 2008/0056532 A1* | 3/2008 | Alasia et al. | | 382/100 |
| 2008/0144947 A1* | 6/2008 | Alasia et al. | | 382/232 |
| 2008/0267514 A1* | 10/2008 | Alasia et al. | | 382/232 |

* cited by examiner

SYSTEM AND METHOD FOR NETWORK-BASED OBJECT AUTHENTICATION

CROSS-REFERENCE TO RELATED APPLICATIONS

This application is a continuation of U.S. application Ser. No. 11/207,437 filed Aug. 19, 2005, which is a continuation-in-part of U.S. application Ser. No. 11/068,350, filed Feb. 28, 2005, now U.S. Pat. No. 7,512,249 which claims priority to U.S. Provisional Application No. 60/565,300, filed Apr. 26, 2004, all of which are incorporated herein by reference in their entirety. The application is also related to U.S. application Ser. No. 10/847,962 ('962 Application) filed May 18, 2004 and U.S. application Ser. No. 10/897,943 ('943 Application) filed May 18, 2004, each of which is incorporated herein by reference in its entirety.

FIELD OF THE INVENTION

The invention relates generally to the field of counterfeit protection, and more particularly to the field of object authentication through the use of an encoded image.

BACKGROUND OF THE INVENTION

Document falsification and produce counterfeiting are significant problems that have been addressed in a variety of ways. One of the more successful approaches has been the use of latent or hidden images applied to or printed on objects to be protected. These images are generally not viewable without the assistance of specialized devices that render them visible.

One approach to the formation of a latent image is to optically encode the image so that, when printed, the image can be viewed only through the use of a corresponding decoding device. Such images may be used on virtually any form of printed document including legal documents, identification cards and papers, labels, currency, stamps, etc. They may also be applied to goods or packaging for goods subject to counterfeiting.

Objects to which an encoded image is applied may be authenticated by decoding the encoded image and comparing the decoded image to an expected authentication image. The authentication image may include information specific to the object being authenticated or information relating to a group of similar objects (e.g., products produced by a particular manufacturer or facility). Production and application of encoded images may be controlled so that they cannot easily be duplicated. Further, the encoded image may be configured so that tampering with the information on the document or label is readily apparent.

Authentication of documents and other objects "in the field" has typically required the use of hardware decoders such as lenticular or micro-array lenses that optically decode the encoded images. These lenses must have optical characteristics that correspond to the parameters used to encode and apply the authentication image and must be properly oriented in order for the user to decode and view the image.

Because they can only be used for encoded images with corresponding characteristics, hardware decoders are relatively inflexible tools. There are also circumstances where the use of an optical decoder to decode encoded images is impractical or undesirable. For example, authentication using an optical decoder requires immediate on-site comparison of the decoded image to the authentication image. This requires that the on-site inspector of the object being authenticated must be able to recognize differences between the decoded image and the expected authentication image. This is impractical in instances where there are many possible variations in the expected authentication image. It also may be undesirable for the on-site inspector to have access to information that may be embedded in the decoded image.

SUMMARY OF THE INVENTION

The present invention provides systems authenticating documents and other objects through the use of encoded images that can be scanned and decoded without the use of a hardware-based decoder.

An aspect of the invention provides a method for determining whether an object is an authentic object to which an expected encoded image has been applied. The expected encoded image having been constructed by encoding an authentication image using a set of one or more encoding parameters. The method comprises receiving a digital image of at least a portion of the test object including a target area where the expected encoded image would be applied if the test object is an authentic object. The method further comprises determining the one or more encoding parameters and applying a digital decoding algorithm to the captured digital image to establish a decoding result. The decoding result may then be compared to object authentication criteria to establish an authentication result. In particular embodiments of the invention, the actions of receiving, determining, applying and comparing are carried out by an authentication server and the digital image is received from an inspection processor over a network.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
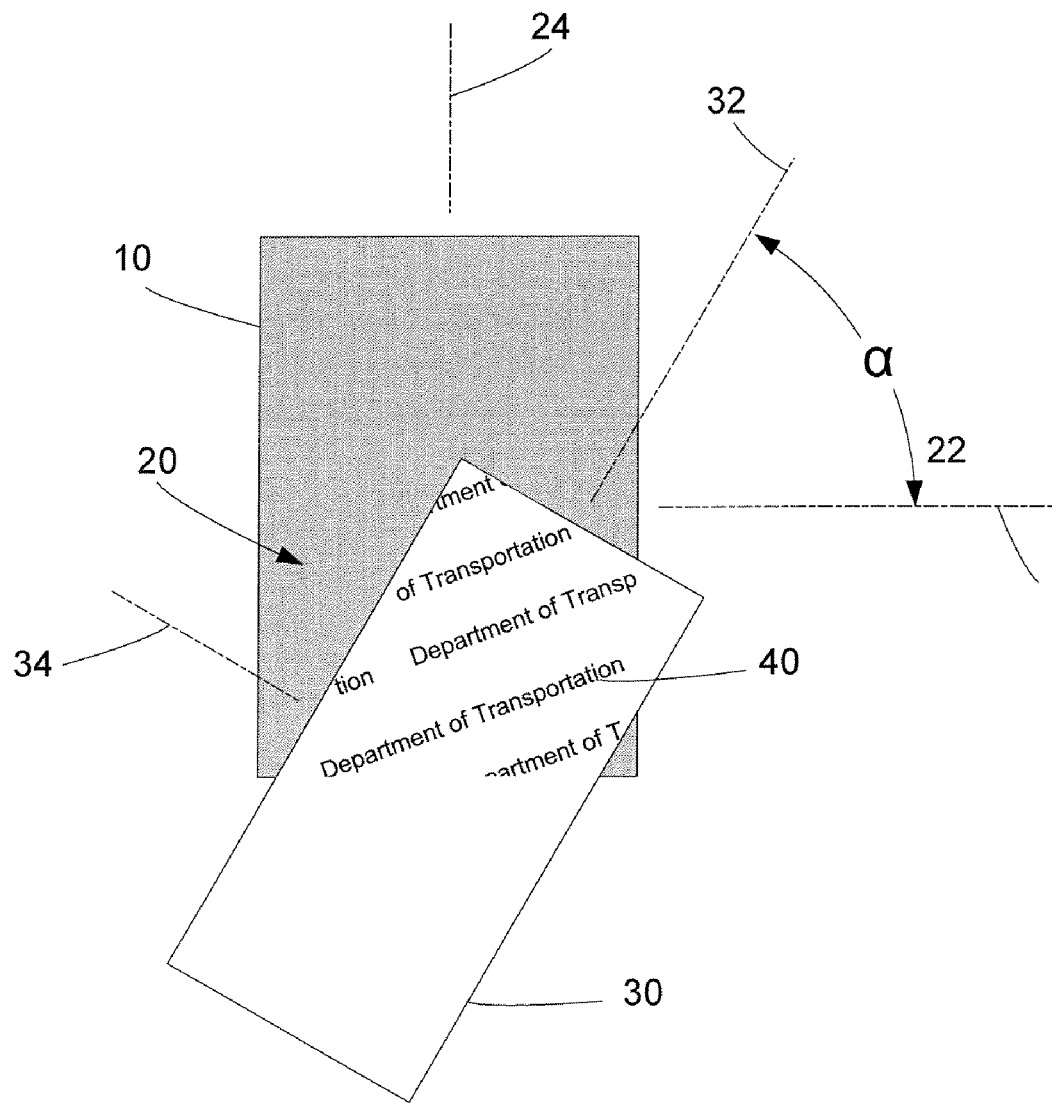
FIG. 1 is an illustration of the use of an optical decoder to decode a printed encoded image.

The present invention provides systems and methods for authenticating documents, commercial products and other objects using optically decodable encoded images. The methods of the invention provide for digitally capturing an encoded image applied to the object to be authenticated. This may be done using a scanner or other imaging device to produce a captured digital image. A data processor equipped with a digital decoder may then be used to identify and decode the encoded image from the captured digital image and to extract indicia and/or information from the decoded result. The extracted indicia and/or information may then be used to authenticate the object or document to which the encoded image was applied. In some embodiments, the decoded image need never be viewed by a human being. In some embodiments, the encoded image may be captured by an on-site inspector who transmits the captured image to a separate processor (or series of processors) where the image is decoded and, optionally, compared to an expected authentication image. The results may then be returned to the on-site inspector other authorized personnel. Other embodiments and variations will be apparent from the following discussion.

As previously discussed, the authentication methods of the invention make use of encoded images that are typically embedded in a background or source image and printed on items that may be subject to alteration, falsification or counterfeiting. As used herein, the term "encoded image" refers to an image that is manipulated and/or hidden within a background field or within another image in such a way that when applied or printed, the encoded image cannot be discerned by the human eye without the use of a decoding device. Some encoded images are hidden so that their presence is difficult to discern from a background or primary image. Other encoded images are easily visible but are unreadable because the image content has been systematically scrambled or otherwise manipulated.

Encoded images of particular significance to the present invention are those that are configured to be optically decoded using a lens-based decoding device. Such images take advantage of the ability of certain types of lenses (e.g., a lenticular lens) to sample image content based on their optical characteristics. For example, a lenticular lens can be used to sample and magnify image content based on the lenticule frequency of the lens. The images used are typically encoded by one of several methods that involve establishing a regularized periodic pattern having a frequency corresponding to that of the lenticular lens to be used as a decoder, then introducing distortions of the pattern that corresponds to the content of the image being encoded. These distortions may be made so small as to render the image difficult or impossible to discern from the regularized pattern with the naked eye. Encoded images of this type can be produced in an analog fashion using specialized photographic equipment as disclosed in U.S. Pat. No. 3,937,565 or digitally as is disclosed in U.S. Pat. No. 5,708,717 ('717 Patent), both of which are incorporated herein by reference in their entirety.

Digitally encoded images can be embedded into a background or into other images so that the mere presence of the encoded image is difficult to discern. With reference to FIG. 1, an encoded image 10 may be established using a primary or source image 20 and a secondary image 40, which is embedded into the primary image 20 in such a way that the secondary image 40 can only be viewed with a decoding device 3030 of a predetermined frequency. The primary image may be a blank gray or colored background image as in the encoded image 10 of FIG. 1 or may include visible image content such as a design or photograph or any other form of indicia. The secondary image may also be any form of image or indicia and may include indicia related in some way to the primary image. In the example encoded image 10, the secondary image 40 is a repeating pattern based on the words "Department of Transportation." The secondary image can be separately encoded then merged or embedded into the primary image or the process of embedding may be accomplished in such a way that the secondary image is encoded as it is embedded. As shown in FIG. 1, the secondary image may be viewed by placing the decoding device 30 over the encoded image 10 at the correct orientation. In the example of FIG. 1, the decoding device has a horizontal axis 32 and a vertical axis 34 and the encoded image 10 has a horizontal axis 22 and a vertical axis 24. The secondary image 40 is revealed when the horizontal axis 32 of the decoding device 30 is oriented at the decoding angle α with respect to the horizontal axis 22 of the encoded image 10. The decoding angle α is an encoding parameter that is established prior to encoding and embedding the secondary image.

The methods by which the secondary image is embedded or merged with the primary image can be divided into two general approaches. In the first approach, a regularized periodic behavior is imposed on the primary image using a predetermined frequency. This is primarily accomplished by rasterizing the primary image at the predetermined frequency. The secondary image is then mapped to the primary image so that the regularized behavior of the primary image can be altered at locations corresponding to those in the secondary image that include image content. The alterations are small enough that they are difficult for the human eye to discern. However, when a lenticular lens having a frequency corresponding to the predetermined frequency is placed over the primary image, it will sample the primary image content in such a way that the alterations are brought out to form the latent secondary image.

In the second approach, the regularized periodic behavior is first imposed on the secondary image rather than the primary image, with alterations in that behavior occurring wherever there is content in the secondary image. The secondary image is then mapped to the primary image and the content of the primary image altered pixel by pixel based on the content of the encoded secondary image.

Another method of embedding an image is commonly used in banknotes and checks. In this method, a latent image is created by changing the direction of raster elements in the visible images at positions corresponding to the content in the hidden image. For example, vertical raster lines in the primary image may be changed to horizontal lines at the locations corresponding to the latent image. The latent image can typically be seen by tilting the banknote slightly. However, the deviations in the primary image can also be decoded using an optical decoder. This is because the raster lines of the primary image will run along the length of the lenticular line of the decoder at the positions where there is no hidden content, but will have only a cross section at the positions where there is a hidden content. This difference makes the hidden image appear much brighter than the visible when viewed through the decoder.

The common thread of all of the above graphical encoding methods and their resulting encoded images is that they involve deviations from regular periodic behavior (e.g., spatial location, tone density, raster angle). The regular periodic behavior and the deviations therefrom may be established based on the encoding methodology used and a predetermined set of encoding parameters. The deviations are made apparent through the use of a decoder having characteristics that correspond to one or more of the encoding parameters. For example, one of the encoding parameters may be the frequency of the regular periodic behavior. The decoder (whether hardware or software-based) must be configured according to that frequency. For example, in the case of a lenticular lens, the lens frequency is established so that the frequency of the regular periodic behavior is equal to the lens frequency or an even multiple of the lens frequency. The lenticular lens may then act as a content sampler/magnifier that emphasizes the deviations from the regularized behavior and assembles them into the secondary image.

A lenticular lens can be used to decode both visible encoded images whose content has been systematically scrambled and encoded images embedded into a primary image or background. As described in U.S. patent application Ser. No. 11/068,350, ('350 Application) however, software-based decoders can also be used to decode encoded images that have been digitally created or captured. These decoders may be adapted to decode any digital version of an optically encoded image including digital encoded images that have never been printed and printed encoded images that have been scanned or transformed by other means into digital form. The digital encoded images may be latent images embedded into background or primary images or may be visible images that have been systematically scrambled or manipulated. The primary image may be a blank image with no discernible content (e.g., a gray box) or may be an actual image with discernible content.

Software for digitally decoding digital encoded i ages may be incorporated into virtually any data processor. For the purpose of practicing the authentication methods of the present invention, the software may use any decoding methodology including, but not limited to, the methods described in the '350 Application. This includes (1) methods that require information on the content of the primary image the secondary image or both the primary and secondary images, and (2) methods that do not require any foreknowledge regarding image content. Both of these method types require knowledge of the encoding parameters used to encode and embed the secondary image.

As described in the '350 Application, printed encoded images may be scanned or digitally captured using an image acquisition device. As used herein, the term "image acquisition device" means any device or system used to capture or produce a digitized image of a document or object or target portions thereof. Image acquisition devices include but are not limited to scanners, digital cameras, and systems having a combination of all analog camera and a frame grabber. The image acquisition device may be adapted for capturing images using light in the visible or non-visible (e.g., UV and IR) portions of the electromagnetic spectrum.

A captured encoded image (e.g., a printed encoded image that has been scanned or otherwise digitally captured using an image acquisition device) may be processed by a decoding processor adapted to apply one or more software-based decoding algorithms to produce a decoding result. Using such methods as optical character recognition (OCR), the decoding processor may also be adapted to extract indicia and/or information from the decoded image and to compare the extracted indicia and/or information to predetermined authentication criteria. As will be discussed, the decoding processor may be at a location remote from the image acquisition device.

Figure 2:
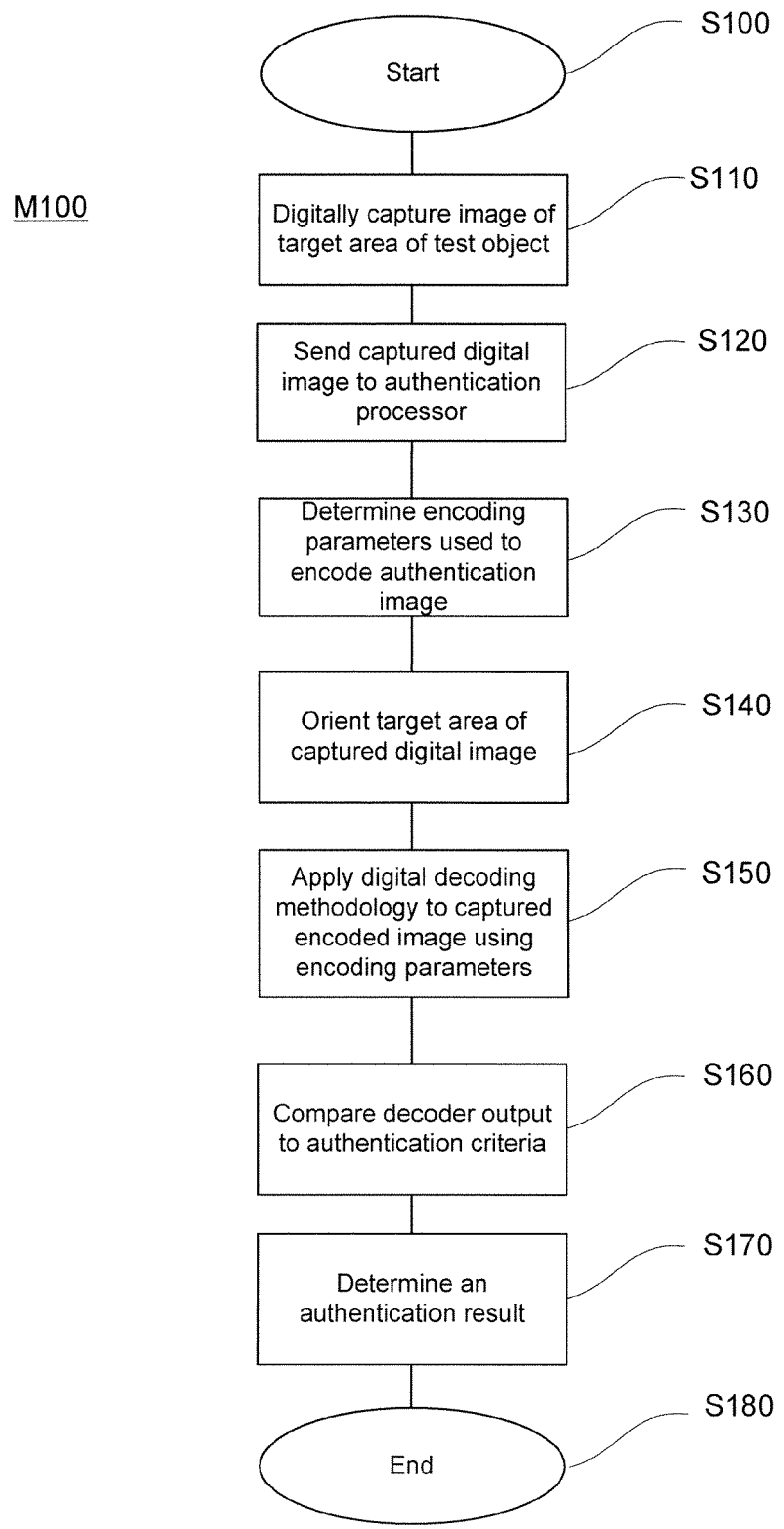
FIG. 2 is a flowchart of a method of authenticating an object according to an embodiment of the invention.

With reference now to FIG. 2, a basic authentication method M100 according to the present invention makes use of the ability to digitally decode a captured encoded image. The method M100 may be used to inspect a test object to determine if an expected encoded image has been applied thereto, the expected encoded image having been applied to all authentic objects. As used herein, the term "authentic" typically indicates that an object was produced by an authorized source or in an authorized manner. The expected encoded images an encoded version of a predetermined authentication image. The expected encoded image may be the same for every object being tested or may be a variable encoded image that is different for each object. Any object not carrying the expected encoded image may be assumed to be indicative of non-authenticity or indicative that the object or indicia applied thereto has not been altered.

The method M100 begins at S100 and at S110 a digital image of the test object is captured using an image acquisition device. The captured digital image may include all or a portion of the object as long as it includes a target area where the expected encoded image would be applied on an authentic object. The captured digital image may be configured so that only the target area is captured or may be configured so that the target area is included in a larger view. In either case, the captured image may also include identifiable orientation marks that allow the identification and proper orientation of the target area portion of the captured digital image. At S120, the captured digital image is sent to an authentication processor. As will be discussed, some or all of the authentication processor may be co-located with the inspection site (i.e., the location where the digital image of the test object is captured) and some or all of the authentication processor may be remote from the inspection site. In either case, the authentication processor may be connected to the image acquisition device over a network The authentication processor may be configured to automatically carry out some or all of the remaining steps of the method M100. At S130, the authentication processor determines one or more of the encoding parameters that were used to encode the authentication image to produce the expected encoded image. The number of parameters required may depend on the specific digital decoding methodology used. The encoding parameters may be obtained from data storage where they are placed at the time of encoding. This data storage may be a part of or co-located with the authentication processor or may be disposed in a separate database processor or server accessible to the authentication processor over a network. The data storage may also take the form of a magnetic stripe, laser card, smart card, processor chip, memory chip or bar code, which can be applied or attached to or otherwise associated with an object to which an encoded image is applied. The encoding parameters and or the authentication image may be object-specific or may be constant for a particular set of objects. In some embodiments, some or all of the encoding parameters may be received with an encoding request or determined from the content of the image.

At S140, the authentication processor may use object landmarks to orient the target area of the captured digital image for decoding. These landmarks may be based on the inherent geometry of the object or may be specifically applied at the time the encoded image is applied to authentic objects. In the latter case, the presence of such landmarks could be used as an initial authentication check. It will be understood by those of ordinary skill in the art that if the digital image is captured in such a way that the object is always oriented in exactly the same way relative to the image acquisition device, there may be no need for digital orientation of the captured image. For example, if the test objects are documents that can be precisely positioned for scanning, the orientation of the target area may be sufficiently constant that orientation of the captured digital image is unnecessary.

Once the target area of the captured digital image is oriented, the authentication processor applies a digital decoding methodology to the captured digital image to produce a decoding result at S150. The decoding result may then be compared to authentication criteria to determine an authentication result at S160. This may be accomplished by displaying the decoding result for visual comparison to the authentication image. Alternatively, OCR or other pattern recognition software can be used to compare the decoding result to the authentication image. In instances where the authentication image contains information that is object-specific, the information content of the decoding result may be compared to information derived directly from the object rather than to the original authentication image.

At S170, an authentication determination is made based on the comparison of the decoding result to the authentication criteria. This determination may be made by a human reviewer of the decoding result or may be made automatically by the authentication processor. In either, case, the authentication result may be stored an or returned to a user or other authorized requestor(s). In embodiments where the authentication determination is made at a location remote from the inspection site, the authentication determination may be transmitted to the inspection site. The method ends at S180.

Figure 3:
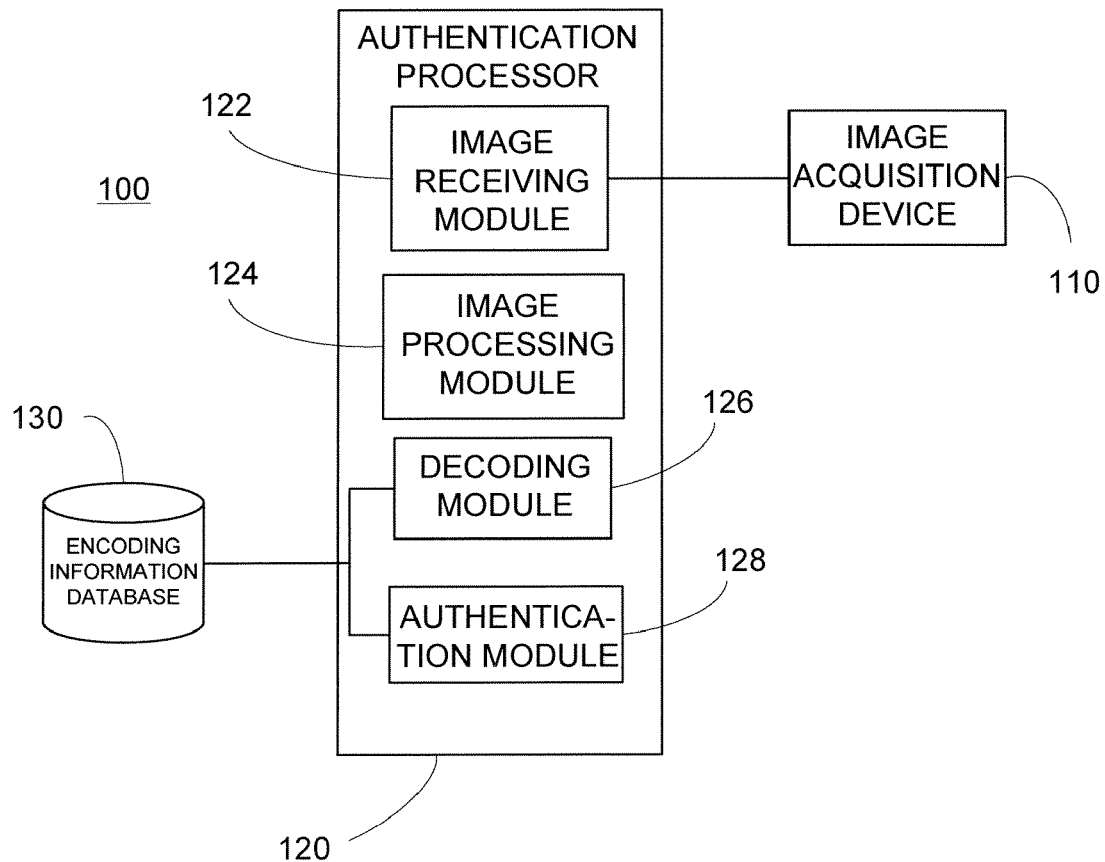
FIG. 3 is a schematic illustration of an object authentication system according to an embodiment of the invention.

With reference to FIG. 3, the method M100 and other methods according to he invention may be carried out using an object authentication system 100 comprising a digital image acquisition device 110 and an authentication processor 120. The object authentication system 120 may also comprise an encoding information database 130 that may be included in or in communication with the authentication processor 120. The object authentication system 100 is configured for inspection and authentication of test objects to verify the presence of an encoded authentication image thereon. Some or all of the encoding parameters and the authentication image use to encode the authentication image may be stored in the encoding information database 130 so that they are accessible to the authentication processor 120.

The image acquisition device 110 may be any device adapted for recording a digital image of at least a portion of the test object containing a target area in which, on authentic objects, an encoded authentication image will have been applied. The authentication processor 120 may be any data processor configured for receiving and processing digital images. The authentication processor 120 includes an image receiving module 122 adapted for selective communication with the image acquisition device 110 and for receiving captured digital images therefrom. The image receiving module 122 transfers the captured digital images to an image processing module 124. The captured digital in age may also be stored in a database in the authentication processor. The image processing module 124 may be adapted for performing any preprocessing required before the captured digital image can be digitally decoded. This may include identifying landmarks in the target area and orienting the captured digital image accordingly.

The authentication processor 120 also includes a decoding module 126 and an authentication module 128. The decoding module 126 may be programmed with digital decoding software adapted for performing one or more decoding algorithms on the captured digital image to produce a decoding result. The decoding module 126 may obtain from the encoding information database any information (e.g., the authentication image and encoding parameters) needed for decoding the captured encoded image. The decoding result may be passed to the authentication module 128, which compares the decoding result to one or more authentication criteria to establish an authentication result. The decoding result, the authentication result or both may be stored in memory, or in a local or remote database, or displayed for use by an on-site inspector or other user.

The components of the authentication system 100 may be interconnected via any suitable means including over a network. The authentication processor 120 may take the form of a portable processing device that may be carried by an individual inspector along with a hand-held image acquisition device (e.g., a portable scanner or digital camera). In some embodiments of the invention, the image acquisition device and the authentication processor may actually be integrated into a single unit. Alternatively, the inspector may carry only a digital acquisition device 110 that is selectively connectable to a remotely located authentication processor 120. For example, a scanning device may be configured to send a captured image to the authentication processor by electronic mail. In another example, a wireless phone with imaging capability can be used to capture an image and forward it to the authentication processor over a telecommunications network. A practical application of this aspect is a scenario in which a potential purchaser of a product captures an image of the product using a camera phone and phones in an authentication request to an authentication processor. The authentication result could be returned to the requester over the phone network in, for example, a text message.

The authentication system 100 is well adapted for use in authenticating a large number of similar objects such as, for example, packaged items in a warehouse or a large number of similar documents. The authentication processor 120 may be adapted so that information relating to individual objects may be entered or derived from the captured digital image. This allows the association of the captured digital image with the particular object. This, in turn, allows the retrieval of object-specific encoding information, which may be required for decoding the captured encoded image or for determining an authentication result.

It will be understood that if the encoding information is not object-specific, a group of test objects with the same expected encoded image can be authenticated by the authentication processor 120 using a single set of encoding information. This set of encoding information can be obtained from the encoding information database 130 once and stored in the memory of the authentication processor 120 where it is accessible to the decoding and authentication modules 126, 128.

Figure 4:
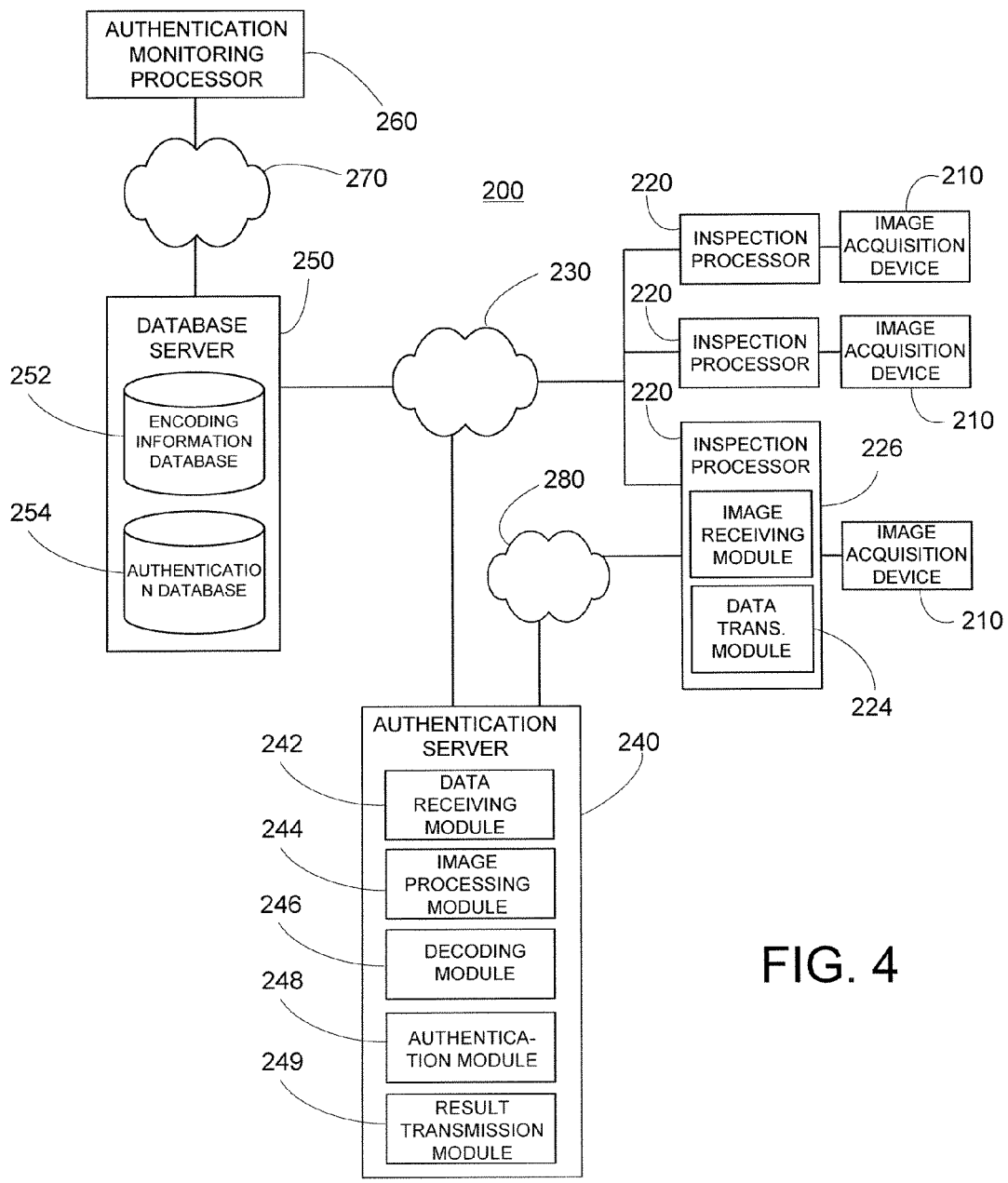
FIG. 4 is a schematic illustration of a network-based object authentication system according to an embodiment of the invention.

The functions of the authentication processor need not be carried out on a single processing device. They may, instead be distributed among a plurality of processors, which may be interconnected over a network. Further, the encoding information required for decoding the captured encoded images taken from test objects and the decoding and authentication results may be stored in databases that are accessible to various users over the same or a different network. With reference to FIG. 4, an authentication system 200 comprises one or more inspection processors 220, an authentication server 240 and a database server 250 in selective communication with one another via one or more networks 230, 270, 280.

Each inspection processor 220 is in communication with one or more associated image acquisition devices 210 adapted for capturing digital images of at least a portion of test objects to be authenticated. Each inspection processor 220 may include an image receiving module 222 adapted for receiving captured digital images from the data acquisition device 210 The inspection processor 220 may also include a data transmission module 224 adapted for transmitting an authentication request including the captured digital image to the authentication server 240 over a first network 280. Alternatively, the transmission module may transmit the captured digital image to the database server 250 for later authentication. The inspection processor 220 may be configured for entry of data associated with the object from which a particular digital image has been captured. Alternatively, the inspection processor may be provided with software for processing the captured digital image to identify and store information related to the object. For example, the captured digital image may include recognizable indicia such as a bar code or numerical identifier which can be decoded to provide information relating to the object.

The inspection processor 220 may optionally include its own image processing decoding and authentication modules similar to those previously described for the authentication processor 120 of authentication system 100. Decoding and authentication results produced by the inspection processor may be compared to results obtained from the authentication server or may be stored for later use. To facilitate image decoding, the inspection processor 220 may be configured to retrieve encoding parameters and/or authentication images from the database server 250 over a second network 230, which may be the same as the first network 280.

The transmission module 224 may be adapted for transmitting the authentication request over the first network 280. In addition to the captured digital image, the transmission request may include additional information associated with the object from which the digital image was captured. This may include any decoding or authentication result produced by the inspection processor 220. The captured digital image and any associated information may be transmitted directly to the authentication server 240 or may be temporarily stored on the database server 250 or another server for later access by the authentication server 240. The authentication request may also include additional information such as information relating to the particular inspection processor and/or the inspector/user, user security information (e.g., user name and password), the location of the inspection site, etc.

The authentication server 240 may comprise a data receiving module 242 configured for receiving the captured digital image and associated information from the inspection processor 220. The data receiving module 142 may alternatively or additionally be configured for retrieving such information from the database server 250 over the second network 230 or a different network. The data receiving module 242 may be adapted to verify user credentials and provide a request acknowledgment back to the inspection processor. The data receiving module 242 may also be configured to transmit a denial of the authentication request if the user credentials or security information provided indicate that the request does not meet predetermined authorization criteria.

The authentication server 240 includes image processing, decoding and authentication modules 244, 246, 248 similar to those previously described for the authentication processor 120 of authentication system 100. Upon establishing that the authentication request was obtained from an authorized user and is associated with an object for which associated encoding information is available, the data receiving module passes the captured digital image to the image processing module 244 to initiate the decoding process. One or more of the authentication server modules 242, 244, 246, 248 may be adapted for retrieving information stored in the database server 250. The database server 250 may include an encoding information server 252, on which may be stored some or all of the authentication image and encoding parameters used to encode the authentication image associated with the objects being authenticated. It will be understood that such encoding information may be stored for a large number of unrelated authenticable objects and object groups for a variety of client users. The information is retrieved based on the object information provided with the authentication request or derived from the captured digital image itself. The retrieved information may be used by the decoding module 246 to produce a decoding result and by the authentication module 248 to produce an authentication result.

The authentication server 240 may also comprise a result transmission module 249 adapted to assemble and transmit an authentication request response including the authentication result. In some embodiments, the request response may also include the decoding result and/or other object-related information. The request response may be transmitted to the inspection processor 220 or other previously designated recipient via the first network 280. The authentication result, decoding result, or both may alternatively or in addition be transmitted over the second network 230 for storage in an authentication database 254. The authentication database 254 may reside on the database server 250 or another server connected to the network 230. The authentication database 254 may be made selectively accessible to one or more authentication monitoring processors 260 over a third network 270. This allows authorized users to access the authentication database to monitor individual and cumulative authentication information and statistics.

It will be understood that the networks 230, 270 and 280 may be the same or different networks. Any or all of these may be any form of local or wide area network. Any or all may for example, be or include the Internet to allow a large number of widespread users. Network 280 may also be a telecommunications network over which digital images may be transmitted from image acquisition devices such as camera phones. It will also be understood that the modules and functions of the authentication server 240 may be distributed among multiple interconnected servers and processors.

The authentication systems of the invention are highly flexible and can be used in a wide variety of authentication scenarios. In a typical scenario, an encoded authentication image is applied to the packaging of a client manufacturer's product that is subject to counterfeiting or tampering. An on-site inspector equipped with a portable inspection processor and an image acquisition device may be dispatched to a site such as a warehouse where a group of packaged products are stored. The inspector may use the image acquisition device to scan or otherwise capture a digital image of the target area of a suspect product package. Additional information such as date, time, location, product serial number, etc., may be entered by the inspector. Some of this information may alternatively be entered automatically by the inspection processor. If the inspection processor is equipped with its own decoding and authentication software, the inspector may authenticate the suspect product immediately. Alternatively or in addition, the inspection processor may be used to submit an authentication request to a remote authentication server. Authentication requests may be sent on an individual item basis. Alternatively, captured authentication images and associated product information may collected for multiple test items and submitted as part of a single authentication request. This would allow, for example, the inspection processor to be used independently of a network connection to collect authentication data from a plurality of test items, then connect to the network (e.g., by logging into an Internet website) for submitting a single batch authentication request.

Upon receiving the authentication request from the inspection processor, the authentication server validates the request, retrieves any required image encoding information from the encoding information database and processes the captured digital image. The captured image is decoded and compared to retrieved authentication criteria to determine an authentication result. The authentication result is then stored in the authentication database. A representative of the manufacturer or other authorized user is then able to access the authentication results by connecting to the authentication database. In some embodiments, this may be accomplished by logging into a security-controlled website and submitting a request for authentication results for the test objects.

In some embodiments, the authentication server may be configured for access through a web site. Authorized users can log onto the web site, upload scanned images, and immediately receive an authentication result on their browser. Results can also be stored in an authentication database for future reviews.

In some embodiments, a web-based authentication service may be implemented using standards for interface and data representation, such as SOAP and XML, to enable third parties to connect their information services and software to the authentication service. This approach would enable seamless authentication request/response flow among diverse platforms and software applications.

As discussed above, the functions of the authentication systems and the actions of the authentication methods of the invention may be carried out using a single data processor or may be distributed among multiple interconnected processors. In some embodiments, for example, the decoding and authentication functions may be carried out by different processors. Aspects of decoding functions themselves may be carried out using a single processor or a plurality of networked processors.

Figure 5:
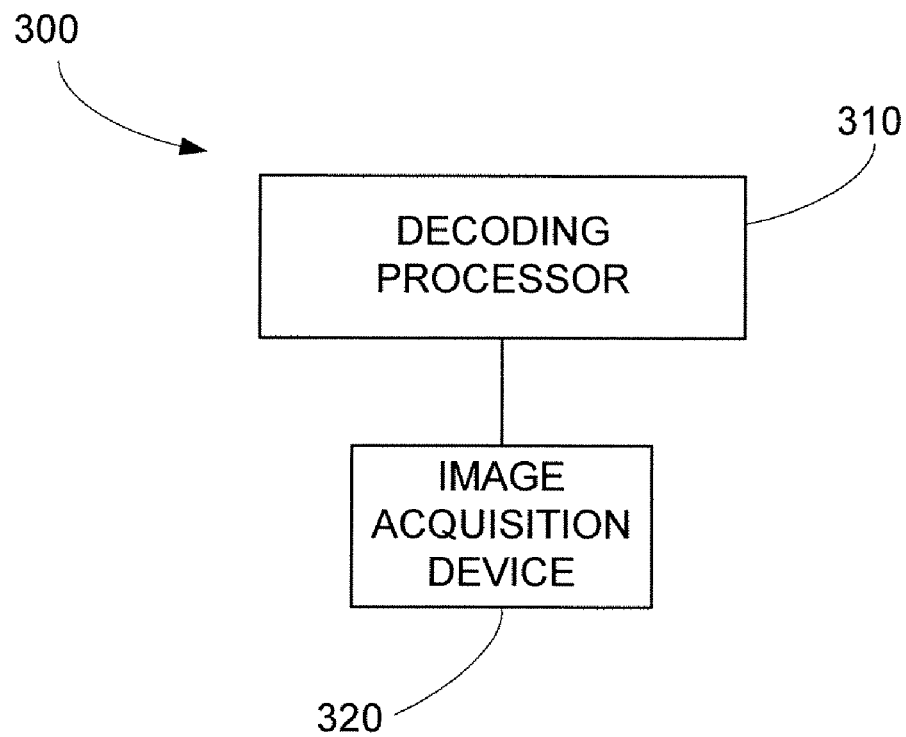
FIG. 5 is a schematic representation of a digital decoding system that may be used in embodiments of the invention.
Figure 6:
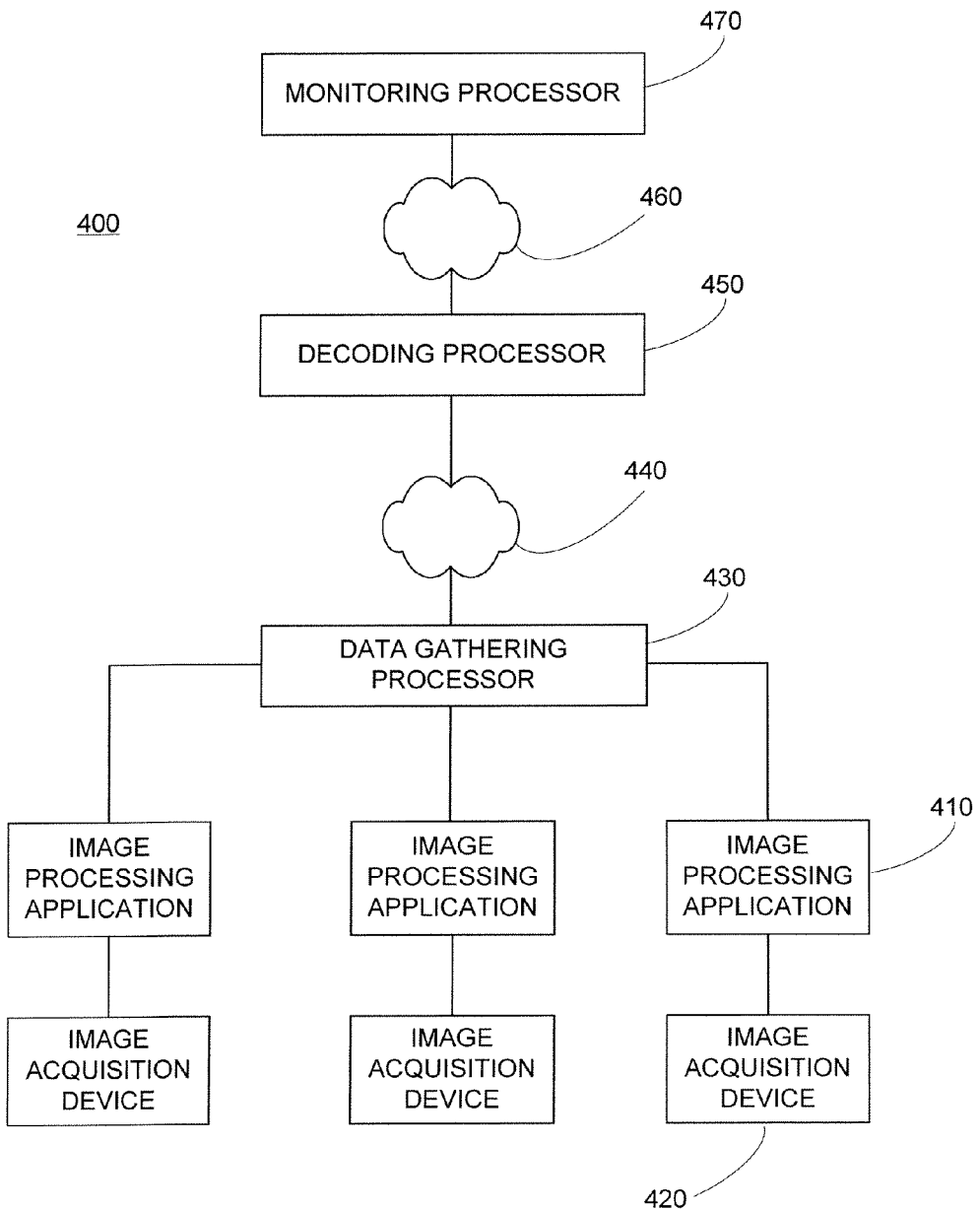
FIG. 6 is a schematic representation of a network-based decoding system that may be used in embodiments of the invention.
Figure 7:
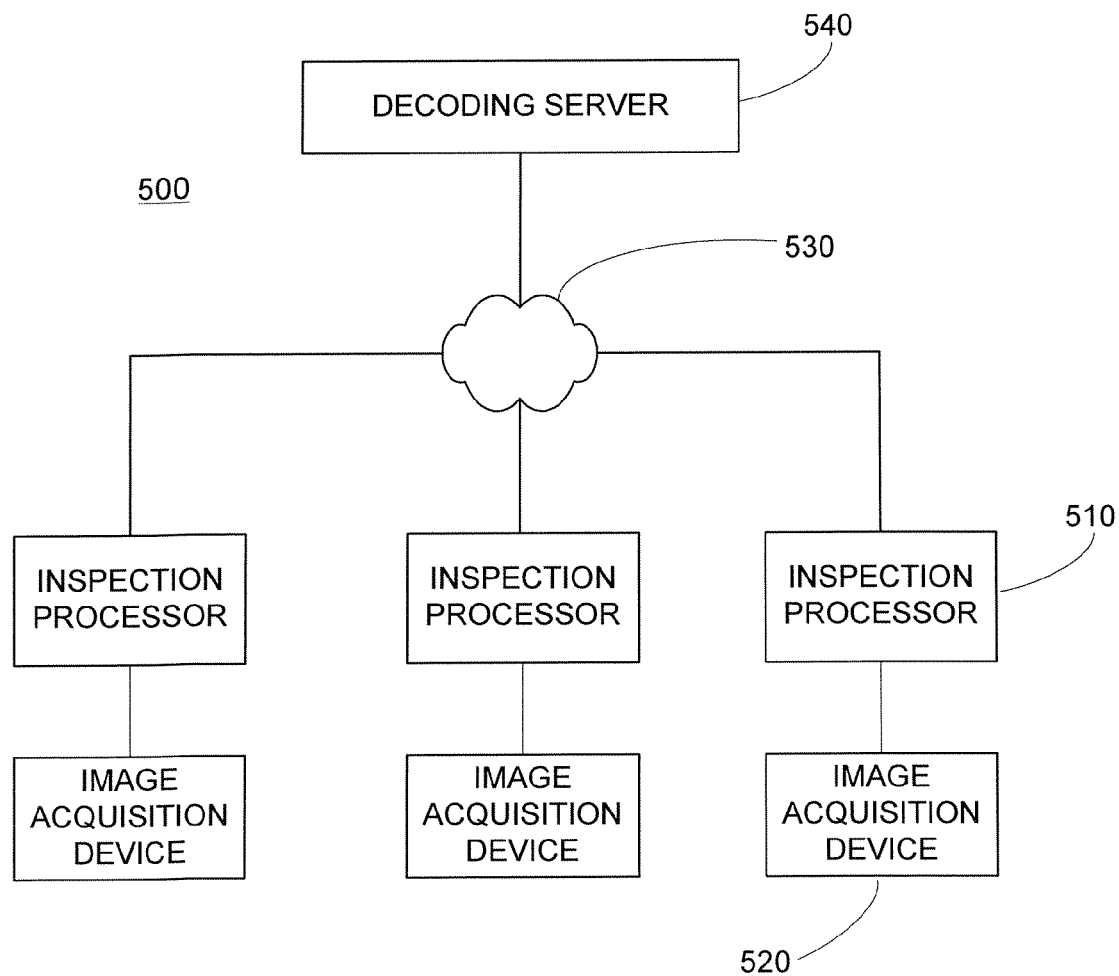
FIG. 7 is a schematic representation of a network-based decoding system that may be used in embodiments of the invention.

FIGS. 5-7 illustrate typical systems for decoding according to the invention. With reference to FIG. 5 a system 300 for digital decoding of a captured digital image is a standalone system that may comprise only a single decoding processor 310 and an image acquisition device 320. The decoding processor 310 is configured to receive captured digital images from the data acquisition device and process them as required to provide a decoding result. The decoding processor 310 may be configured with the software required for applying a particular decoding digital methodology. Some or all of the encoding information required by the decoding software may be stored in the decoding processor 310 and/or may be provided by a user.

The decoding processor 310 will typically include a screen or printer that allows the user of the stand-alone decoding system 300 to scan a package or document and immediately see a decoded result. The result may be stored or it may be used solely as an "on-the-spot" inspection system in which the result can be discarded after viewing by the user/inspector.

Another approach to the decoding system provides for the gathering of multiple captured images and associated article information, which can then be sent in a batch to centralized decoding processor or server. With reference to FIG. 6, a decoding system 400 of this type may comprise one or more inspection stations each having an image acquisition device 420 in communication with an inspection processor 410 having an image processing application resident thereon. In a typical embodiment, the image acquisition device 420 may be a scanner and the image processing application is configured for receiving scanned images from the scanner. Scanned images may be transferred individually or collectively to a data gathering processor 430. The data gathering processor 430 may be in selective communication with the inspection processor 410 over a network. In some embodiments, the inspection processor 410 may be configured to gather and submit a plurality of images and associated object information at one time to the data gathering processor 430.

The scanned images may be transferred along with information relating to the object or document scanned. The data gathering processor 430 may be adapted for receiving captured images and associated object information from an number of inspection processors 410. The captured images and associated object information may be gathered and submitted at the same time to a decoding processor or server 450 over a network 440. In a particular embodiment, the network 440 is the Internet and the decoding processor 450 is accessed via a webpage. Decoding results produced by the decoding processor 450 may be accessed by a monitoring processor 470 over a second network 460 that may be the same as the first network 440.

In a typical scenario for using a decoding system 400, inspectors scan package labels or documents using the image acquisition devices 420 and provide appropriate information (e.g., the location where the package was collected, date and time, product serial number, etc.) for each captured image. At the end of the work day, the scanned images and corresponding data are matched to the decoding processor 450, where they are decoded. The decoding results may be stored at the decoding processor or in a separate database. The decoding results are made accessible to authorized monitoring processors 470. In a particular embodiment, the decoding results may be received over the Internet and may be viewed using a web browser, which displays all scanned and decoded images, as well as the other data provided by inspectors at the time of scanning.

The separation of data gathering and decoding enables distributed information gathering, and centralized, web based decoding. This also enables centralized storage of the decoding results and facilitates automated authentication. The results can be shared among members of a specific user group (e.g., a brand protection team) and may be reviewed by their management. Analysis of the cumulative results can help in the detection of global and local counterfeiting trends. It can also provide an insight into the efficiency of the current deterrent measures in the different markets. Another advantage of the separation and independence of data gathering and decoding operations is that customers can hire contractors for package scanning at certain markets, without revealing detailed information about anti-counterfeiting features on the package. In addition, inspectors do not need uninterrupted network access—they need only connect to the decoding processor occasionally (e.g., at the end of a work day or work week).

In some cases, however, an inspector may need to authenticate a single item. If network access is available at the time the image is captured, the distributed approach to data gathering may unnecessarily delay decoding and authentication. Further, the distributed approach may require the presence of dedicated software to accommodate multiple file uploads from the client's processor to the central processor and ensure the integrity of this data exchange. An alternative model for single decoding functionality is a network application that provides for uploading a single scanned file for decoding and immediately receiving and displaying a decoded image. This model is particularly useful in the context of an Internet-based system in which the inspector logs on to a decoding website using a web browser. Using the website, the inspector can upload a singe captured image and receive/display a decoding result on his browser. This approach would be widely usable by individuals needing to a single packaged product. It could be used, for example, by a pharmacist wanting to authenticate a single drug package, or a forensic examiner who wants to check a single banknote or ID card. The only required equipment would be a scanner (or other image acquisition device) and a computer connectable to the Internet, Intranet or other or other communications network through which a decoding server/processor can be reached.

FIG. 7 illustrates a network-based decoding system 500 according to an embodiment of the invention. The decoding system 500 may include one or more inspection processors 510 in selective communication with the decoding server 540 over a network 530. Each inspection processor 510 may have a associated image acquisition device 520 for capturing digital images and transferring them to the inspection processor 510. It will be understood that the image acquisition device 520 and the inspection processor 510 may be combined into a single processing unit. In a typical embodiment, the image acquisition device 520 is a scanner and the inspection processor 510 is configured for receiving a scanned image from the scanner and selectively uploading it to the decoding server 540.

The network 530 may be any communications network such as the Internet, an Intranet, or a cellular or other telecommunications network. In a particular embodiment of the decoding system 500, the network 530 is the Internet and the inspection processor 510 is equipped with a web browser to establish communication with the decoding server 540 through a website administered by the decoding server 540. This provides the capability for an interactive, web-based decoding process in which a captured digital image is uploaded to the decoding server 540 where it is processed to provide a decoding result. The decoding result is then returned to the inspection processor for display or printing.

The decoding server 540 may include or have access to one or more databases in which encoding information is stored for use in applying the appropriate decoding methodology for a particular user. This information may be pre-associated with a product line or even specific products or documents. User information an or access rules may also be stored so that the decoding server 540 can determine if a particular user is entitled to logon on to the system or to receive a particular decoding result.

Figure 8:
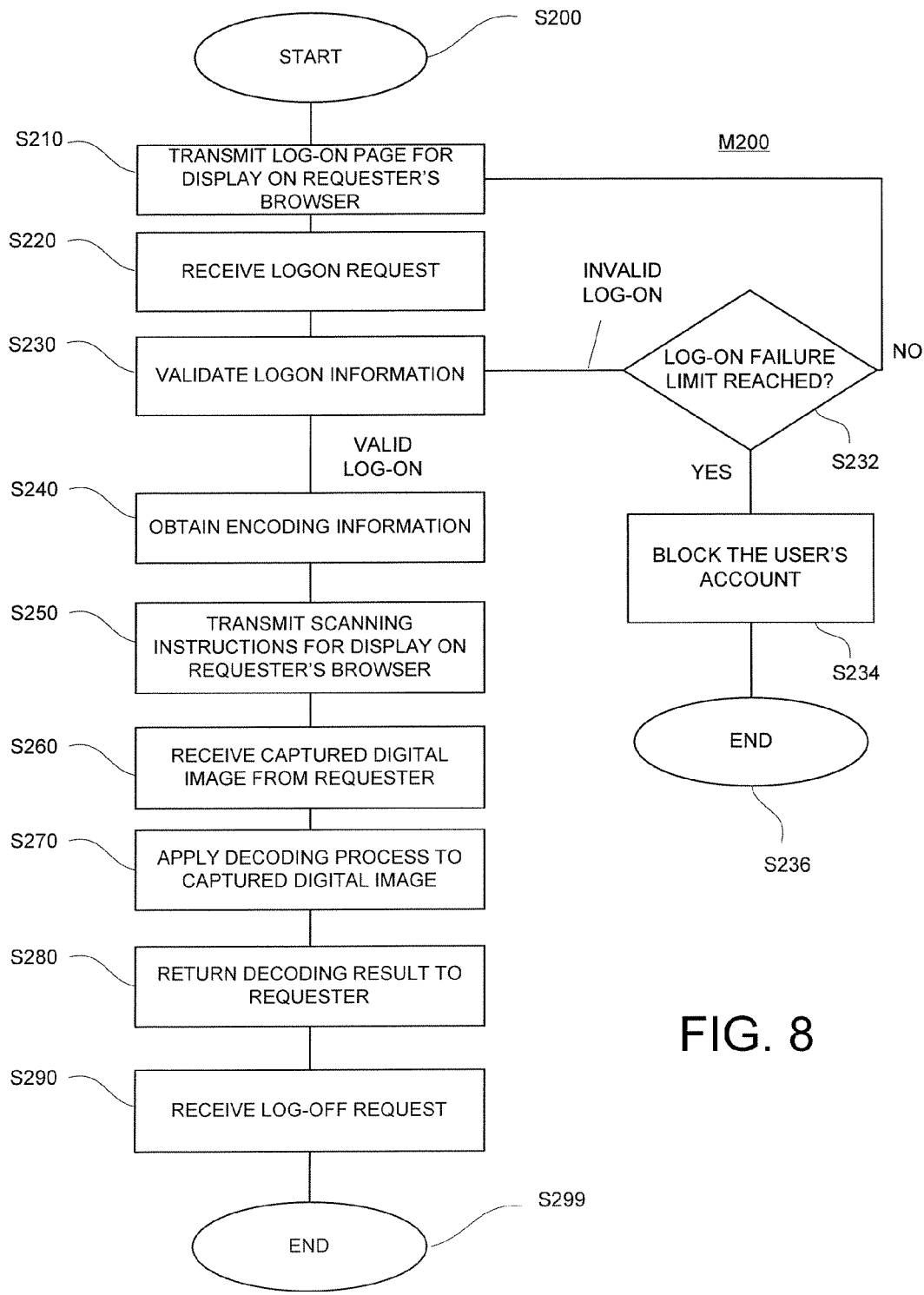
FIG. 8 is a flow diagram of a network-based method of providing an interactive image decoding service to a user.

A method of providing a digital image decoding service in an interactive network-based session is illustrated in FIG. 8. The method begins at S200. At S210, a log-on page is transmitted to the inspection processor for display via a web browser or similar application. At S220, a log-on request is received from the inspection processor. The log-on request may include a username and password and/or other required user information. At S230, the log-on information is reviewed to determine if the log-on is valid and a decoding session should be established. If the log-on information is not associated with a valid user account or the associated security information does not match information for the specified user, the method proceeds to S232 where a check is performed to determine if a predetermined number of consecutive log-on failures has been reached. It not, an error message may be transmitted and the method returns to S210. The predetermined failure limit has been reached, the user account is blocked at S234 and the method ends at S236.

If a valid log-on is received, the method proceeds to S240 where encoding information is obtained based on information associated with the user account and/or information supplied by the user interactively. User-supplied information may, for example, include product or document identification. The encoding information r ay be obtained from a database in which such information is associated with user and/or product information. Certain encoding information may also be included in the user-supplied information.

User-supplied information m ay be included in the log-on request or may be provided in response to prompts transmitted to the user's inspection processor. In a particular embodiment, the decoding server may have stored therein or may have access to one or more decoding configurations that have been pre-associated with the user or user class. These decoding configurations represent options that may be used to decode captured images of different products, documents or other objects. Upon validating the log-on of a particular user, the decoding server may retrieve a list of the decoding configurations associated with the user and transmit the list to the inspection processor for display to the user. The user may then select the decoding configuration appropriate for the object that has been captured in the digital image to be decoded. Upon receiving the user's selection, the decoding processor may then obtain the encoding information needed to decode the captured image.

A particular decoding configuration may require that the digital image be captured in a particular manner. For example, it may be necessary that the image may be scanned at a particular orientation. Accordingly, at S250, scanning instructions may optionally be transmitted to the inspection processor for display. The user may then scan or otherwise capture the digital image in the appropriate manner and upload it to the decoding server.

At S260, the captured digital image file is received from the user/decoding requester. At S270, the encoding information and the appropriate decoding methodology are used to process the captured digital image and obtain a decoding result. At S280, the decoding result is transmitted to the user where it can be displayed or printed. Any number of additional images may be uploaded and decoded in a particular interactive session. At S290, a log-off request is received and the method ends at S299.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. A method for determining whether a test object is an authentic object to which an expected encoded image has been applied, the expected encoded image having been constructed by encoding an authentication image using a set of one or more encoding parameters so that if the expected encoded image is printed the authentication image is not discernible to a viewer without an optical decoding device having characteristics corresponding to at least one of the set of one or more encoding parameters, the method comprising:

Receiving a digital image of at least a portion of the test object including a target area where the expected encoded image, which was constructed so that if the expected encoded image is printed the authentication image is not discernible to a viewer without an optical decoding device having characteristics corresponding to at least one of the set of one or more encoding parameters, would be applied if the test object is an authentic object; determining the one or more encoding parameters; and applying a digital decoding algorithm to the captured digital image to establish a decoding result; wherein the actions of receiving, determining and applying are carried out by a decoding processor.

2. A method according to claim 1 wherein the digital image is received from an inspection processor over a network.

3. A method according to claim 2 wherein the network is the Internet.

4. A method according to claim 2 wherein the network is a telecommunications network.

5. A method according to claim 1 wherein the action of determining includes retrieving the one or more encoding parameters from an encoding information database.

6. A method according to claim 1 further comprising:
in an authentication processor, comparing the decoding result to object authentication criteria to establish an authentication result.

7. A method according to claim 6 further comprising:
transmitting the decoding result from the decoding processor to the authentication processor over a first network.

8. A method according to claim 7 wherein the digital image is received from an inspection processor over a second network with a request for authentication of the object.

9. A method according to claim 8 wherein the request for authentication includes at least one of the set consisting of object information, inspection processor information, requestor information, username and password information, and inspection location information.

10. A method according to claim 6 further comprising:
extracting decoded indicia from the decoding result.

11. A method according to claim 10 wherein the action of comparing the decoding result includes:
retrieving the authentication image from an encoding information database; and
comparing the decoded indicia to authentication image indicia.

12. A method according to claim 10 wherein the action of comparing includes:
comparing the decoded indicia to object-specific information.

13. A method according to claim 12 wherein the object-specific information is received with the digital image.

14. A method according to claim 12 wherein the object-specific information is retrieved from at least one of the set consisting of a database, a smart card, a magnetic strip, a bar code, a processor chip and a memory chip.

15. A method according to claim 12 wherein the object-specific information is extracted from the digital image.

16. A method according to claim 6 further comprising:
storing in an authentication database by a database server at least one of the set consisting of the decoding result and the authentication result.

17. A method according to claim 6 further comprising:
receiving by the database server from a monitoring processor a result request for the authentication result;
determining by the database server whether the result request is valid; and
in response to a determination that the result request is valid, transmitting the authentication result from the database server to the monitoring processor.

18. A method according to claim 17 wherein the result request is received from the monitoring processor and the authentication result is transmitted to the monitoring processor over a network.

19. A method according to claim 18 wherein the network is the Internet.

20. A method according to claim 17 wherein the authentication result is transmitted via electronic mail.

21. A method according to claim 17 wherein the authentication result is transmitted via text message over a telecommunications network.

22. A method according to claim 1 wherein the digital image is received via electronic mail.

23. A method according to claim 1 wherein the digital image is received via text message transmitted over a telecommunications network.

* * * * *